UNITED STATES PATENT OFFICE.

ORA WILLIS KNIGHT, DECEASED, LATE OF PORTLAND, MAINE, BY MINNIE G. KNIGHT, EXECUTRIX, OF PORTLAND, MAINE.

PROCESS OF TREATING SULFITE WASTE LIQUOR AND PRODUCT THEREOF.

1,143,714.   Specification of Letters Patent.   Patented June 22, 1915.

No Drawing.   Application filed August 10, 1914.   Serial No. 856,083.

*To all whom it may concern:*

Be it known that I, MINNIE G. KNIGHT, a citizen of the United States, and a resident of Portland, county of Cumberland, and State of Maine, executrix of the last will and testament of ORA WILLIS KNIGHT, deceased, late a citizen of the United States and a resident of Portland, Maine, do respectfully represent that the said ORA WILLIS KNIGHT did during his lifetime invent certain new and useful Improvements in and Pertaining to Processes of Treating Sulfite Waste Liquor and Products Thereof, of which the following is a specification.

This invention relates to a process of utilizing waste sulfite liquor, and to the products resulting from said process, and has for its object the commercial utilization of said material, by the mode described below, and the products of said treatment.

The waste sulfite liquor may be treated in its natural condition, as blown from the digesters, or it may be more or less diluted with wash water, and it may be more or less concentrated, but preferably the liquor is treated after it has been submitted to a treatment for the removal of all or a portion of its crystallizable and fermentable saccharine matter, either by fermentation or some other method. If fermented, the alcohol produced may be first distilled off, and recovered.

In the manufacture of wood pulp, the wood is generally boiled with a solution of calcium bisulfite, or magnesium bisulfite, or a mixture of these materials, under pressure, and about one half the weight of the wood goes into solution, as complex dissolved organic matters, said to consist, at least in part of calcium lignone sulfonate, of more or less unknown composition. The waste liquor is known to contain some fermentable sugars. This liquor is preferably concentrated, and fermented, and the alcohol distilled off, and then is in the form best suited for treatment in accordance with the present invention. During the preliminary treatment the liquor should be neutralized, or nearly so, with lime, magnesia, or equivalent. This liquor, so treated may then be treated with a phenol such as ordinary phenol ($C_6H_5OH$) or a cresol, or mixtures containing one or more such bodies, such as creosote oil, and heated therewith, either at atmospheric pressure, or a higher pressure, to produce a condensation product. During this step, condensation agents, such as acids, alkalis, salts, are added (in particular the following agents give good results, hydrochloric acid, 3 to 10%, caustic soda, 2 to 4%, caustic potash, 2 to 5%; sodium thiosulfate, 6 to 10%; potassium dichromate, 8%; lime 3 to 5%; zinc chlorid, 2 to 4%; instead of the latter, the equivalent amount of hydrochloric acid and zinc may be used, giving whiter and purer products; and ammonium carbonate, 2 to 4%.) The amounts stated are based on the weight of phenol used, and the weight of phenol is taken as roughly equal to the weight of the total solids in the liquor. When the mixture is thus heated to about the boiling point of water, for about an hour, or preferably to a higher temperature, for a shorter time, under pressure, the mixture separates, and gives two layers, the condensation product, and an aqueous layer, and this condensation product, upon further heating, either with or without condensing agents, produces solid condensation products. These latter are generally of a resinous nature, and may be used as substitutes for shellac, in making varnishes, or may be used as rubber substitutes. These products, upon further heating produce insoluble, plastic bodies, suitable for insulating purposes.

Wood or other porous material may be impregnated with the mixture of waste liquor, phenol and condensing agent, and then heated to produce the condensation. Wood so treated is preserved, and hardened, and is suitable for use in making insulators, and various other articles.

In the case where the sugars of the liquor are first converted into alcohol, it is not necessary to separate the alcohol, but if desired, the alcohol may be converted into aldehyde, and then the phenol and condensing agent added, and then heated, as above to produce the condensation. In this manner, the product will consist of the condensation product of the phenol and lignone compound and the condensation product of aldehyde and phenol. A suitable mode of carrying out this double reaction is as follows, the parts being by weight: After the fermentation of the sugars to produce alcohol, and without distillation of the alcohol, the per cent. of alcohol is roughly determined, and a sufficient amount of sodium or potassium dichromate is added to convert the alcohol into acetaldehyde, a small amount of an acid condensing agent added, and the liquor warmed, to produce the aldehyde, and the phenol added. The amount of phenol in this case should be sufficient to combine with the aldehyde and with the lignone compounds of the waste liquor. In a particular experiment, the inventor used a waste liquor, fermented, and containing 100 grams of total solids, about 1 gram of alcohol, 101 grams of phenol, 8 grams of $K_2Cr_2O_7$, and produced 140 gr. of a solid condensation product by heating under some pressure to 120° C. The potassium dichromate acting as the oxidizer to convert the alcohol into the aldehyde, and the chromium salt produced acting as the condensing agent. In other experiments, iron salts have been used as the condensing agent, with good results, especially $FeCl_3$, and $FeSO_4$, and $Fe_2(SO_4)_3$. In case it is not desired to convert the alcohol into aldehyde, the fermented liquor, the phenol, and the condensing agent may be heated, and the alcohol recovered during the condensing step. During, or before the condensing step, various materials may be added, suitable as diluents of the condensation product, to alter certain of the properties, such materials as nitro-, chloro- or amido compounds of anilin, naphthalene, benzol, toluol, or anthracene. The products of this treatment have different properties from those produced without these additions.

What is claimed is:—

1. A process which comprises treating a liquor containing a lignone derivative with a phenol, in the presence of a condensing agent.

2. A process of forming condensation products, which comprises heating a phenolic body, with a liquor containing a lignone derivative to a temperature sufficient to produce a condensation product.

3. A process which comprises heating a fermented waste sulfite liquor with a phenolic body, to a temperature sufficient to produce condensation.

4. A process of utilizing waste sulfite liquor, which comprises fermenting said liquor, adding a material capable of oxidizing at least a part of the alcohol into aldehyde, adding a phenol, and heating the mixture sufficiently to convert the aldehyde into a phenol-aldehyde condensation product.

5. A composition of matter containing a condensation product of a phenol and a lignone.

6. A material including a condensation product of a phenol and a lignone, in admixture with a condensation product of a phenol and an aldehyde.

In testimony whereof, I have signed my name in the presence of two witnesses, this seventh day of August 1914.

MINNIE G. KNIGHT,
*Executrix of the last will and testament of Ora Willis Knight.*

Witnesses:
L. M. WEBB,
CHARLES J. NICHOLS.